United States Patent [19]
Tung

[11] Patent Number: 6,027,227
[45] Date of Patent: Feb. 22, 2000

[54] ILLUMINANT WARNING ARRANGEMENT

[76] Inventor: Jung Fang Tung, No. 9, Lane 39, N. Hou-Sing Road, Kansang, Kaohsiung, Taiwan

[21] Appl. No.: 08/922,999

[22] Filed: Sep. 3, 1997

[51] Int. Cl.[7] .............................. F21L 15/08; F21L 15/16; F21L 15/18
[52] U.S. Cl. .......................... 362/241; 362/310; 362/237; 362/397; 362/398; 362/103
[58] Field of Search .................................... 362/267, 310, 362/235, 237, 240, 249, 800, 103, 241, 247, 397, 398, 252

[56] References Cited

U.S. PATENT DOCUMENTS

| | | | |
|---|---|---|---|
| 5,016,145 | 5/1991 | Singleton | 362/80.1 |
| 5,375,044 | 12/1994 | Guritz | 362/104 |
| 5,455,749 | 10/1995 | Ferber | 362/103 |
| 5,795,211 | 8/1996 | Carignan | 446/220 |

*Primary Examiner*—Sandra O'Shea
*Assistant Examiner*—Marshall Honeyman
*Attorney, Agent, or Firm*—Raymond Y. Chan; David and Raymond

[57] ABSTRACT

An illuminant warning arrangement includes a clothe body and a plurality of illuminating units provided on the clothe body. Each illuminating unit provides a transparent layer, an electric conducting board, a casing socket, a fastener, an LED, a battery box, and a manual switch. With the combination of the above elements, the illuminant warning arrangement can be assembled in matter of seconds. When the illuminant warning arrangement is in used, its displaying area is large enough to catch other drivers' attention from far away. When the illuminant warning arrangement is not in use, it can be folded into a compact package, so that it would not occupy unnecessary space in the trunk of the vehicle for easy storage.

6 Claims, 4 Drawing Sheets

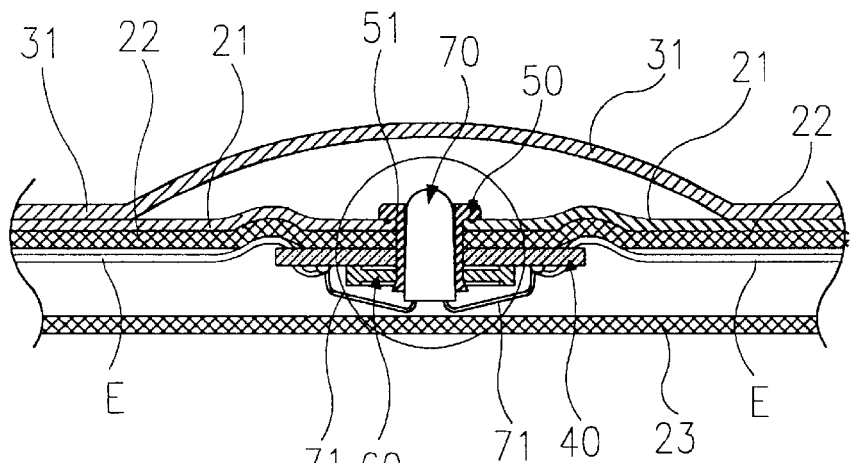
FIG.3-A
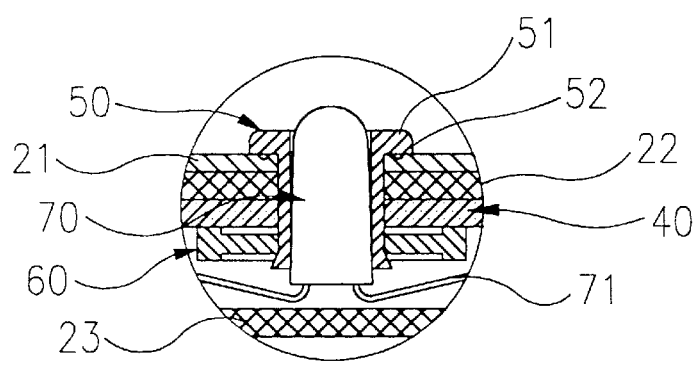
FIG.3-B
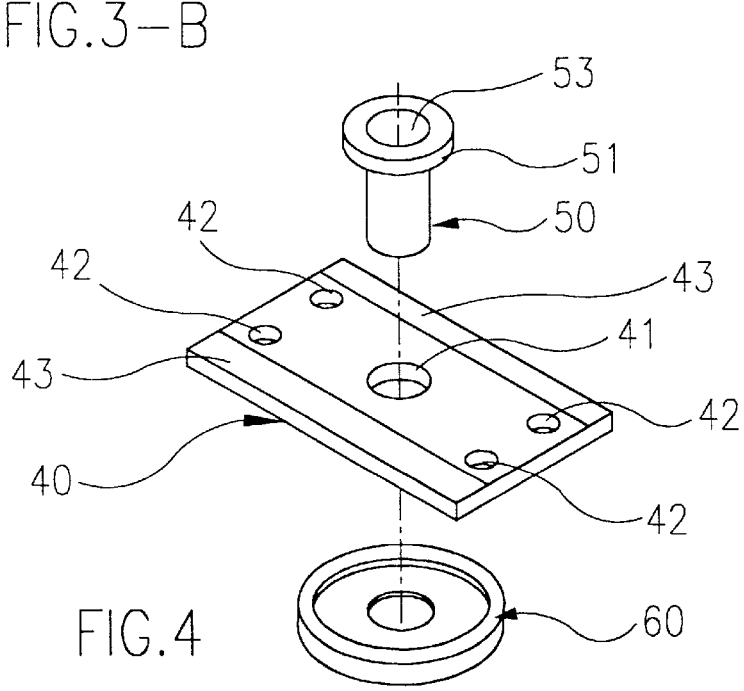
FIG.4

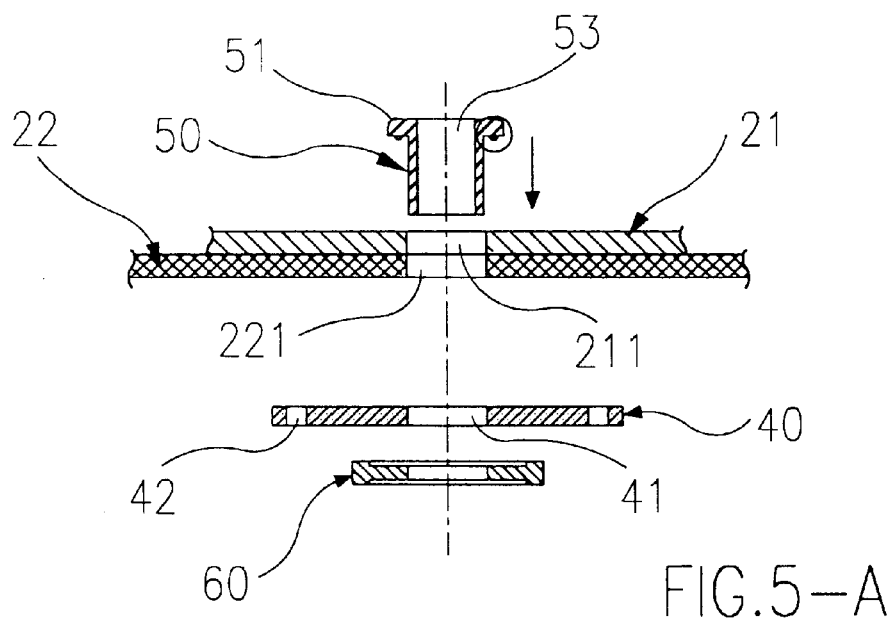
FIG.5-A
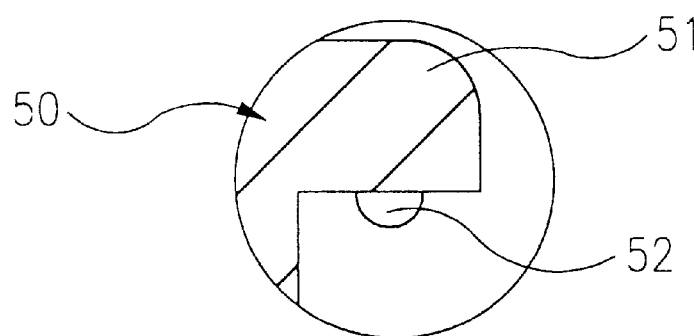
FIG.5-B
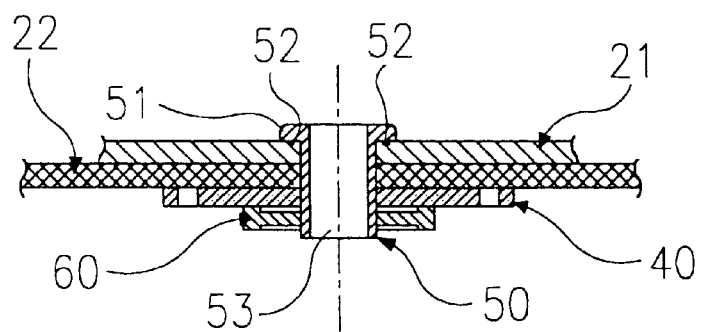
FIG.6

ILLUMINANT WARNING ARRANGEMENT

FIELD OF THE PRESENT INVENTION

The present invention relates to a safety warning arrangement and more particularly to an illuminant warning arrangement having an illuminating device equipped with a light reflector device to provide an alert warning for other vehicles on the road, especially during night time or poor weather conditions, so as to avoid an accident.

BACKGROUND OF THE PRESENT INVENTION

Normally when a vehicle breaks down or has trouble on the road, the driver can place a conventional triangular light reflecting warning sign, a warning cone, or a smoke flare behind the troubled vehicle for alert warning. The conventional light reflecting triangular warning sign and the warning cone work fine during daytime or high visibility hours. However, when the weather is rainy or foggy, with low visibility other drivers may fail to observe the warning sign or the warning cone and crash into the troubled vehicle.

The conventional light reflecting triangular warning sign and the warning cone also have the following shortcomings. Most of the conventional light reflecting triangular warning signs and the warning cones are not easy to store because of their sizes. Although the size of the conventional light reflecting triangular warning sign and the warning cone seem too large to fit well in the trunk of the vehicle, when they are placed on the road, they become too small to catch the attention of other drivers. The earlier the other drivers can detect the bad road conditions ahead, the more reaction time the other drivers may have to avoid the accident.

Another major disadvantage of the conventional light reflecting triangular warning sign and the warning cone is that they do not provide self-flashing or self-illuminating functions. As mentioned above, during low visibility conditions, such as bad weather or nighttime, other drivers may not be able to clearly observe the warning signs that would lead to an accident.

Although the smoke flare is highly visible during daytime, the flare does not stand out as much during the nighttime. Furthermore, since the flare can not be reused, it is not economical and practical. Each flare can only last for certain designated hours. If the driver does not prepare enough flares, the driver would be in trouble when all the flares are burned out.

SUMMARY OF THE PRESENT INVENTION

The main objective of the present invention is to provide an illurninant warning arrangement, which not only provides a light reflector device, but also comprises a plurality of build-in self-flashing illuminating units to alert other drivers in high visibility, during either day time or night time, to provide safety protection for the drivers and the troubled vehicle. Moreover, the illuminating units are specifically designed to bring instant attention from other drivers on the road from far away.

Another objective of the present invention is to provide an illurninant warning arrangement, which has an easy and convenient installation process and can be assembled in matter of seconds. When the illuminant warning arrangement is in used, its displaying area is large enough to attract other distance drivers' attention. When it is not in used, it can be folded into a compact package, so that it would not occupy unnecessary space in the trunk of the vehicle for easy storage.

According to the present invention, an illuminant warning arrangement comprises a clothe body and an illuminant device. The illurninant device comprises a battery box, a manual switch and a plurality of illuminating units provided on the clothe body, in which each illuminating unit comprises a transparent layer, an electric conducting board, a casing socket, a fastener, and a LED. The present invention not only can provide the light reflecting function as in the conventional warning sign, but also can provide flashing light, especially during low visibility condition in bad weather, or late night, so that the driver and the troubled vehicle can be easily observed by the other drivers on the road.

BRIEF DESCRIPTION OF THE DRAWINGS

FIG. 3A is a sectional end view of the illuminating unit, along section line B—B of FIG. 1, according to the above-preferred embodiment of the present invention.

FIG. 3B is an enlarged sectional view of the encircled portion in FIG. 3A according to the above-preferred embodiment of the present invention.

FIG. 4 is a perspective view, illustrating a casing socket passing through an electric conducting board and a fastener, according to the above-preferred embodiment of the present invention.

FIG. 5A is an exploded sectional view, illustrating the casing socket passing through a top clothe layer, the electric conducting board, and the fastener, according to the above preferred embodiment of the present invention.

FIG. 5B is an enlarged sectional view of the encircled portion in FIG. 5A, illustrating a protrusion on a protruding rim of the casing socket, according to the above-preferred embodiment of the present invention.

FIG. 6 is a sectional view for illustrating the casing socket passing through the top clothe layer, the electric conducting board, and the fastener according to the above preferred embodiment of the present invention.

DETAILED DESCRIPTION OF THE PREFERRED EMBODIMENT

Figure 1:
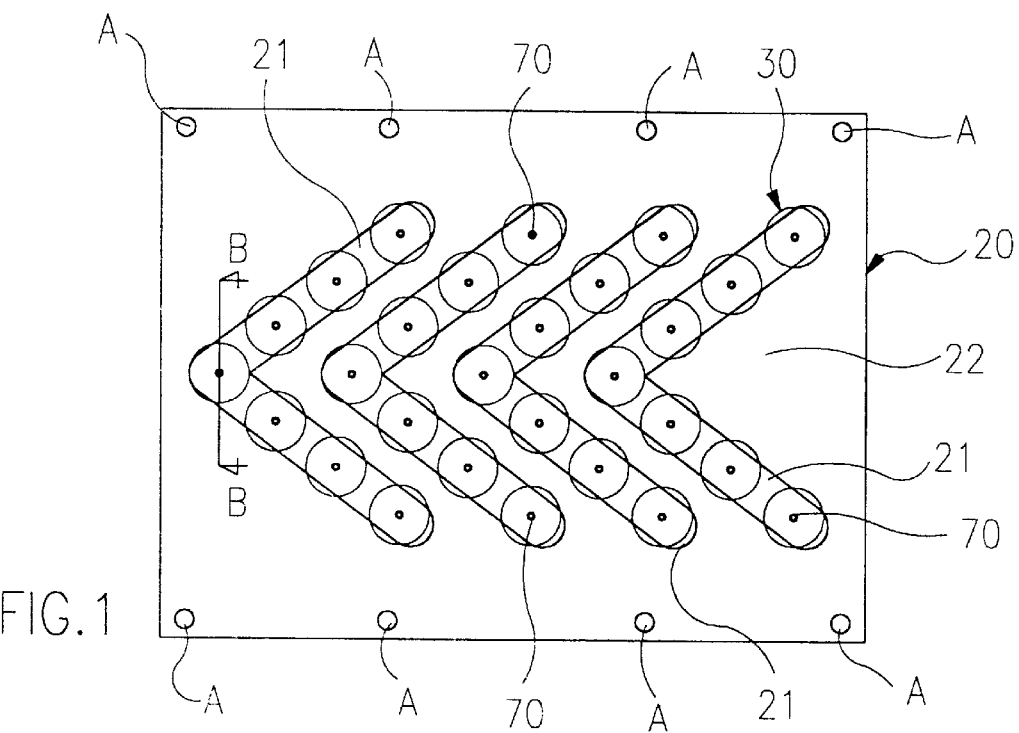
FIG. 1 is a top view of an illuminant warning arrangement according to a preferred embodiment of the present invention.
Figure 2:
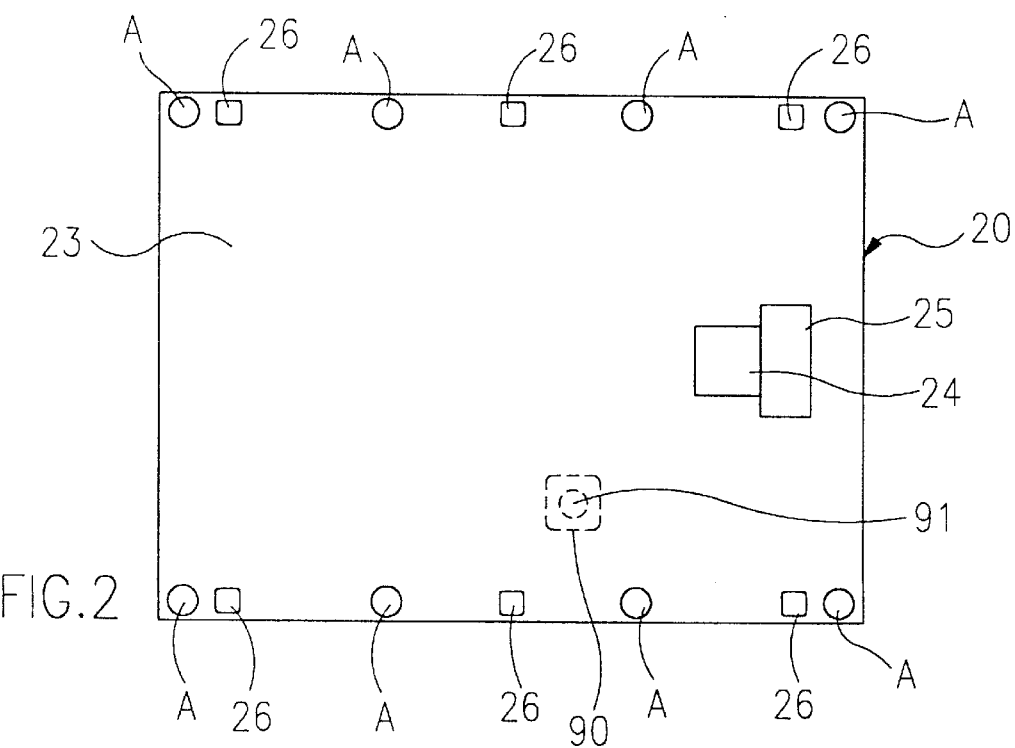
FIG. 2 is a bottom view of the illuminant warning arrangement according to the abovepreferred embodiment of the present invention.

Referring to FIGS. 1 to 8 of the drawings, an illuminant warning arrangement according to a preferred embodiment of the present invention is illustrated. The illuminant warning arrangement comprises a clothe body 20 and a plurality of illuminating units 30 installed on the clothe body 20, wherein the clothe body 20 comprises a top clothe layer 22 and a bottom clothe layer 23. A plurality of light reflectors 21 are provided on the top clothe layer 22 in form of predetermined figures or signs. The top clothe layer 22 and the bottom clothe layer 23 are made of a kind of PVC material.

Figure 8:
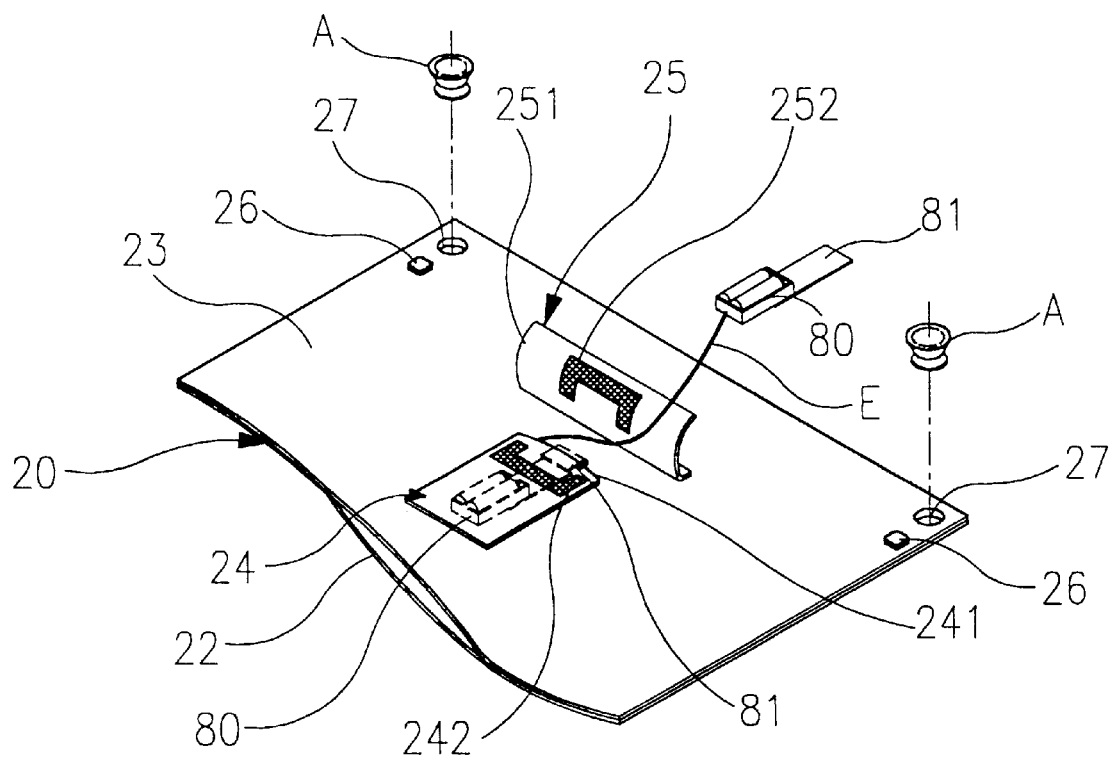
FIG. 8 is a partial perspective view of the illuminant warning arrangement according to the above-preferred embodiment of the present invention showing a battery box positioned in a battery container.

A peripheral edge of the top clothe layer 22 is sealedly connected to a peripheral edge of the bottom clothe layer 23 in a water tight manner by means of an ultrasonic or a heat treatment process, so as to define a hollow pocket 200 between the top clothe layer 22 and the bottom clothe layer 23 (as shown in FIG. 8). Each of the light reflectors 21 has a plurality of through holes 211 arranged evenly and spacedly thereon. The top clothe layer 22 also provides a plurality of apertures 221 at the locations coaxially aligned with the through holes 211 of the light reflectors 21. The bottom clothe layer 23 has a battery container 24 affixed thereon for receiving a battery box 80, in which the battery container 24 has an opening 241 and a male loop and hoop fastener 242 positioned near the opening 241.

The bottom clothe layer 23, near the opening 241 of the battery container 24, further provides a cover 25, which has an outer edge affixed on the bottom clothe layer 23 and a free end 251 for covering the opening 241 of the battery container 24. The free end 251 provides a female loop and hoop fastener 252 at a respective location with the male loop and hoop fastener 242 of the battery container 24 for fastening the cover 25 to the battery container 24 in order to close the opening 241.

The peripheral edge of the bottom clothe layer 23, attaches a plurality of magnetic elements 26 and has a plurality of affixing holes 27, in which the magnetic elements 26 are adapted for attaching the bottom clothe layer 23 of the clothe body 20 to a metallic surface for spreading out the clothe body 20. A plurality of suckers A are firmly mounted on the affixing holes 27 respectively, for attaching the bottom clothe layer 23 of the clothe body 20 to a nonmetallic surface while spreading out the clothe body 20.

The illuminating units 30 are positioned within the hollow pocket defined between the top clothe layer 22 and the bottom clothe layer 23, and installed respectively at each of respective through holes 211 along the light reflectors 21. Each illuminating unit 30 is electrically interconnected by electrical wires E. Each illuminating unit 30 comprises a transparent layer 31, a electric conducting board 40, a casing socket 50, a fastener 60, and a LED 70, in which a peripheral edge of the transparent layer 31 is affixed to a rim of the through hole 211 of the light reflector 21 as well as the surface of the top clothe layer 22 by ultrasonic or heat treatment process. The electric conducting board 40 has a socket hole 41 centrally and coaxially provided thereon, four corresponding wire holes 42 are respectively formed on two ends of the electric conducting board 40, so that the corresponding wires E can pass therethrough and electrically welded to two electrical conducting regions 43 provided on two sides of the electric conducting board 40 (as shown in FIGS. 3A and 4).

Figure 7:
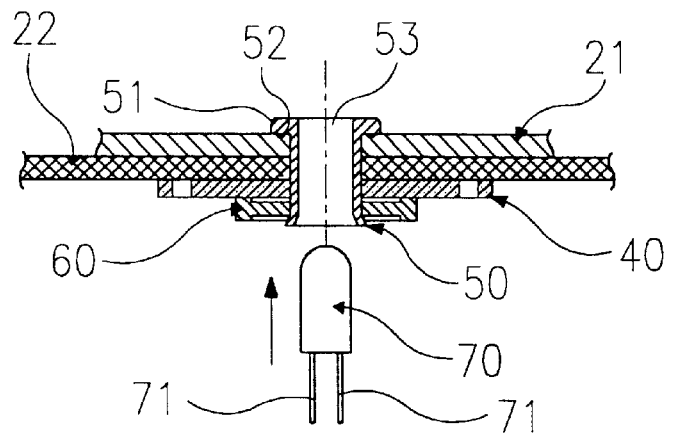
FIG. 7 is a sectional view for illustrating the casing socket engaging through the top clothe layer, the electric conducting board, and the fastener, according to the above preferred embodiment of the present invention.

Referring to FIGS. 5A, 6, and 7, the casing socket 50 is penetrated through the through hole 211 of the light reflector 21, the aperture 221 of the top clothe layer 22, the socket hole 41 of the electric conducting board 40, and the fastener 60, as shown in FIG. 6. A bottom end of the casing socket 50 is engaged with the fastener 60, as shown in FIG. 7, in order to firmly bind the light reflector 21, the top clothe layer 22, and the electric conducting board 40 together. As shown in FIG. 5B, a top portion of the casing socket 50 has a protruding rim 51, which has a plurality of protrusions 52 integrally protruded from a bottom edge thereof. The function of the protrusions 52 of the protruding rim 51 is to press against a top surface of the light reflector 21, so that when the wires E are inserted through the wire holes 42, the light reflectors 21 are is prevented from popping up. Therefore, the through hole 211 of each of the light reflectors 21 would not be torn apart. According to the present embodiment, the bottom end of the casing 50 is riveted into the fastener 60. Then, the electric conducting board 40, the casing FIG. 7. The protrusions 52 of the protruding rim 51 of the casing socket 50 are pressed against the top surface of the light reflector 21 (as shown in FIG. 6).

Referring to FIGS. 4 and 7, the LED 70 is inserted in an axial socket hole 53 of the casing socket 50. Two terminal ends 71 of the LED 70 are electrically welded to two electrical conducting regions 43 of the electric conducting board 40 respectively (as shown in FIGS. 3A and 3B). A first end of each wire E is electrically connected to other illuminating units 30 and also to the battery box 80, so that it can be turned on and off by a manual switch 90.

As shown in FIG. 8, the battery box 80, which has at least a battery installed therein, provides a pull out handle 81 which has an end disposed outside of the opening 241 of the battery container 24, so that the user easily and conveniently take out the battery box 80 from the battery container 24 to exchange the battery. The manual switch 90 provides a button 91 which is disposed outside of the bottom clothe layer 23 for switching on or off of the illuminant warning arrangement of the present invention.

Accordingly, when the illuminant warning arrangement of the present invention is spread to a ready to use position, by pressing the button 91 of the manual switch 90 can activate the power source from the battery box 90 through the wires E to the electric conducting boards 40 to the LEDs 70, so that the LEDs 70 can flash and be observed through the transparent layer 31. According to the special arrangement of the figures or signs provided on the warning arrangement, a warning effect to the other drivers on the road is thus provided.

Therefore, the illuminant warning arrangement of the present invention has the following advantages over the conventional warning signs:

1. The installation process of the illuminant warning arrangement is easy and convenient. It can be assembled in matters of seconds. When the illumnnant warning arrangement is spread for use, the displaying area is large enough to catch other drivers' attention from far away. When the illuminant warning arrangement is not in used, it can be folded into a compact package, so that it would not occupy unnecessary space in the trunk of the vehicle for easy storage.

2. The function of the illuminant warning arrangement of the present invention would not be affected by low visibility caused by bad weather condition or night time darkness, because the warning light and the relatively large displaying surface can be seen from far away to warn the oncoming vehicle. It can give the driver adequate time to react to the situation by slowing down to pass through the trouble spot, and thus prevent accident from happening.

3. The illuminant warning arrangement of the present invention is constructed in a watertight manner, so that even during raining day, the present invention can still normally fimction. Water can not get into the hollow packet of the clothe body, so that the electric conducting board and the battery box are well protected.

4. The illuminant warning arrangement of the present invention is powered by battery. The LEDs can provide warning signals for a long period of time to protect the troubled vehicle and the driver.

I claim:

1. An illuminant warning arrangement, comprising:

a clothe body comprising a top clothe layer and a bottom clothe layer, wherein a peripheral edge of said top clothe layer is sealedly connected to a peripheral edge of said bottom clothe layer in a water tight manner, so as to define a hollow pocket between said top clothe layer of said bottom clothe layer, wherein said top clothe layer provides a plurality of apertures thereon, and said bottom clothe layer has a battery container affixed thereon for receiving a battery box, wherein said battery container has an opening and a male loop and hoop fastener positioned near said opening, moreover said bottom clothe layer further provides a cover near said opening of said battery container, said cover having an outer edge affixed on said bottom clothe layer and a free end for covering said opening of said battery container, said free end having a female loop and hoop fastener provided at a location with respect to said male loop and hoop fastener of said battery container for fastening said cover to said battery container;

a plurality of light reflectors being attached on said top clothe layer in form of predetermined figures, each of said light reflectors having a plurality of through holes arranged evenly and spacedly thereon, wherein said through holes are aligned coaxially with said apertures of said top clothe layer respectively, and a plurality of illuminating units, which are installed on said clothe body and are electrically interconnected by electrical wires, are positioned within said hollow pocket between said top clothe layer and said bottom clothe layer and installed respectively at said respective through holes along said light reflectors, wherein each of said illuminating unit comprises:

a transparent layer having a peripheral edge affixed to a rim of said respective through hole of the light reflector and a surface of said corresponding top clothe layer, an electric conducting board having a socket hole centrally and coaxially provided thereon, wherein two pairs of wire holes are formed on two ends of said electric conducting board for said electrical wires to respectively pass therethrough and to electrically weld to two electrical conducting regions provided on two sides of said electric conducting board, a casing socket, which has an axial socket hole, being penetrated through said respective through hole of said light reflector, said respective aperture of said top clothe layer, said respective socket hole of said electric conducting board, and said fastener, wherein a top portion of said casing socket has a protruding rim and a bottom end of said casing socket is engaged with said fastener, wherein said electric conducting board, said casing socket and said fastener are solidly affixed on said top clothe layer, and said protrusions of said protruding rim of said casing socket are pressed against said top surface of said light reflector, an LED being inserted into said axial socket hole of said casing socket, two terminal ends of said LED being welded to said two electrical conducting regions of said electric conducting board respectively, a first end of each of said electrical wires being electrically connected to said electric conducting board, another end of each of electrical wires being electrically connected to said other illuminating units and said battery box, and a manual switch having a button disposed outside of said bottom clothe layer for switching said battery box on and off.

2. An illuminant warning arrangement, as recited in claim 1, wherein said top clothe layer and said bottom clothe layer are made of PVC material.

3. An illuminant warning arrangement, as recited in claim 2, wherein at said peripheral edge of said bottom clothe layer, a plurality of affixing holes are provided for a plurality of suckers to insert therethrough for attaching said bottom clothe layer of said clothe body to a nonmetallic material when in used.

4. An illuminant warning arrangement, as recited in claim 2, wherein at said peripheral edge of said bottom clothe layer, a plurality of magnetic elements are affixed thereon for attaching said bottom clothe layer of said clothe body to a metallic surface.

5. An illuminant warning arrangement, as recited in claim 3, wherein at said peripheral edge of said bottom clothe layer, a plurality of magnetic elements are affixed thereon for attaching said bottom clothe layer of said clothe body to a metallic surface.

6. An illuminant warning arrangement, as recited in claim 4, wherein said battery box provides a pull out handle which has an end disposed outside of said opening of said battery container.

* * * * *